US 9,887,858 B2

(12) United States Patent
Hooli et al.

(10) Patent No.: US 9,887,858 B2
(45) Date of Patent: Feb. 6, 2018

(54) METHOD AND APPARATUS FOR USING DEMODULATION REFERENCE SIGNAL MULTIPLEXING IN WIRELESS COMMUNICATION

(75) Inventors: Kari Juhani Hooli, Oulu (FI); Esa Tapani Tiirola, Kempele (FI); Kari Pekka Pajukoski, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/520,897

(22) PCT Filed: Jan. 8, 2010

(86) PCT No.: PCT/EP2010/050156
§ 371 (c)(1),
(2), (4) Date: Jul. 6, 2012

(87) PCT Pub. No.: WO2011/082829
PCT Pub. Date: Jul. 14, 2011

(65) Prior Publication Data
US 2012/0281656 A1 Nov. 8, 2012

(51) Int. Cl.
*H04L 23/02* (2006.01)
*H04J 11/00* (2006.01)
(Continued)

(52) U.S. Cl.
CPC .......... *H04L 23/02* (2013.01); *H04J 11/0023* (2013.01); *H04J 13/22* (2013.01); *H04L 27/2613* (2013.01)

(58) Field of Classification Search
CPC ..... H04W 72/04; H04W 88/08; H04W 76/00; H04W 80/04
(Continued)

(56) References Cited

U.S. PATENT DOCUMENTS

| 2004/0160893 A1* | 8/2004 | Park ................. H04L 27/2617 370/206 |
| 2009/0279493 A1* | 11/2009 | Gaal et al. .................. 370/329 |
| 2009/0304045 A1 | 12/2009 | Lei et al. |

FOREIGN PATENT DOCUMENTS

| CN | 101390327 A | 3/2009 |
| EP | 2 056 515 A1 | 5/2009 |
(Continued)

OTHER PUBLICATIONS

R1-092801 UL RS Enhancement for LTE-Advanced:, 3GPP TSG RAN WG1 Meeting bis Los Angeles, USA, Jun. 29-Jul. 33, 2009, NTT DOCOMO, p. 1-5.*
(Continued)

*Primary Examiner* — Joseph Bednash
(74) *Attorney, Agent, or Firm* — Harrington & Smith (57) ABSTRACT

The present solution discloses a method and apparatus for controlling demodulation reference signal allocation of a user equipment by utilizing a cyclic shift subset determined for demodulation reference signal multiplexing orders supported by the user equipment. Within the cyclic shift subset, demodulation reference signal resources that cause the most significant interference to each other are identified, and cyclic shifts corresponding to the identified demodulation reference signal resources, are linked with as orthogonal complementary multiplexing resources as possible. If more than one cyclic shift subsets are determined for a demodulation reference signal multiplexing order, at least one cyclic shift subset is ignored for said demodulation reference signal multiplexing order.

21 Claims, 3 Drawing Sheets

(51) Int. Cl.
*H04J 13/22* (2011.01)
*H04L 27/26* (2006.01)

(58) Field of Classification Search
USPC .................................................. 370/328, 329
See application file for complete search history.

(56) References Cited

FOREIGN PATENT DOCUMENTS

| JP | 2013516139 A | 5/2013 |
|---|---|---|
| TW | I311015 B | 6/2009 |
| TW | I312243 B | 7/2009 |
| TW | I316800 B | 11/2009 |
| WO | WO-2008044553 A1 | 4/2008 |
| WO | WO-2009041029 A1 | 4/2009 |

OTHER PUBLICATIONS

3GPP "Evolved Universal Terrestrial Access (E-UTRA); Physical Channels and Modulation," May 2009, pp. 25-28.*
LG Electronics, "Consideration on DM-RS design for UL SU-MIMO in LTE-A", 3GPP TSG-RAN WG1 Meeting #59, Jeju, Korea, Nov. 9-13, 2009, R1-094785.*
Texas Instruments, "UL DM RS Multiplexing for SU-MIMO", 3GPP TSG RAN WG1 59, Jeju, Korea Nov. 9-13, 2009, R1-094763.*
Draft Report of 3GPP TSG RAN WG1 #49 v0.4.0 (Kobe Japan, May 7-11, 2007).*
NEC Group, "Clarifications for DMRS parameters", 3GPP TSG-RAN Meeting #54, R1-03374, Jeju, Korea, Aug. 18-22, 2008.*
NTT DOCOMO et al. "UL RS Enhancement for LTE-Advanced", 3GPP TSG RAN WG1 Meeting #59, Jeju Korea, Nov. 9-13, 2009, R1-094911.*
3GPP TS 36.211 V9.0.0 (Dec. 2009); 3rd Generation Partnership Project; Technical Specification Group Radio Access Network; Evolved Universal Terrestrial Radio Access (E-UTRA); Physical Channels and Modulation (Release 9).*
Etri, "PHICH resource identification for extended CP"; 3GPP TSG RAN WG1 Meeting #55, Prague, Czech Rep., Nov. 10-14, 2008, R1-084530.*
R1-092801, 3GPP TSG RAN WG1 Meeting #57bis, Los Angeles, USA, Jun. 29-Jul. 3, 2009, "UL RS Enhancement for LTE-Advanced", NTT DoCoMo, 5 pgs.
3GPP TSG RAN WG1 Meeting #59; R1-094911; NTT DOCOMO, NEC Group; "UL RS Enhancement for LTE-Advanced"; Jeju, Korea, Nov. 9-13, 2009.
3GPP TSG RAN WG1 Meeting #58; R1-093307; Nokia Siemens Networks, Nokia; "Uplink DM RS performance evaluation from CoMP viewpoint"; Shenzhen, China, Aug. 24-28, 2009.
3GPP TSG RAN WG1 Meeting #59; R1-094785; LG Electronics; "Consideration on DM-RS design for UL SU-MIMO in LTE-A"; Jeju, Korea, Nov. 9-13, 2009.
3GPP TSG-RAN Meeting #54bis; R1-083929; Nokia Siemens Networks, Nokia; "Parameter values of cell specific UL DM RS cyclic shifts"; Prague, Czech Republic, Sep. 29-Oct. 3, 2008.
3GPP TSG RAN WG1 59; R1-094763; Texas Instruments; "UL DM RS Multiplexing for SU-MIMO"; Jeju, Korea, Nov. 9-13, 2009.
3GPP TSG RAN WG1 #59 meeting; R1-094951; Mitsubishi Electric; "Orthogonal cover codes for uplink DM-RS"; Jeju, South Korea, Nov. 9-13, 2009.
Panasonic; "Views on UL DM-RS"; R1-094508; 3GPP TSG RAN WG1 Meeting #59, Jeju, Korea; Nov. 9-13, 2009; pp. 1-4; 3rd Generation Partnership Project (3GPP); Mobile Competence Centre; 650, Route des Lucioles; F-06921 Sophia-Antipolis Cedex; France.
Nokia Siemens Networks; "Email discussion summary on UL DM RS"; R1-100335; 3GPP TSG RAN WG1 #59bis Meeting, Valencia, Spain; Jan. 18-22, 2010; pp. 1-10; 3rd Generation Partnership Project (3GPP); Mobile Competence Centre; 650, Route des Lucioles; F-06921 Sophia-Antipolis Cedex; France.

\* cited by examiner

METHOD AND APPARATUS FOR USING DEMODULATION REFERENCE SIGNAL MULTIPLEXING IN WIRELESS COMMUNICATION

FIELD

The exemplary and non-limiting embodiments of the invention relate generally to wireless communications networks, and more particularly to cyclic shift separation of signals.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. Cyclic shift (CS) separation is to be used as the primary multiplexing scheme of demodulation reference signals (DMRS) in LTE-advanced. OCC (orthogonal cover code) is one option to be used as a complementary multiplexing scheme for CS separation. Another option is to use IFDMA (interleaved frequency domain multiple access) as a complementary multiplexing scheme for CS separation.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention, there is provided a method for controlling demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to another aspect of the present invention, there is provided a method for applying demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided a method for determining demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided an apparatus comprising: a processor configured to control demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided an apparatus comprising: a processor configured to apply demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided an apparatus comprising: a processor configured to determine demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided a computer readable memory embodying a program of instructions executable by a processor to perform actions directed toward controlling demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided a computer readable memory embodying a program of instructions executable by a processor to perform actions directed toward applying demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

According to yet another aspect of the present invention, there is provided a computer readable memory embodying a program of instructions executable by a processor to perform actions of determining demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resource is indicated by a signalled cyclic shift index.

BRIEF DESCRIPTION OF THE DRAWINGS

In the following the invention will be described in greater detail by means of preferred embodiments with reference to the attached drawings, in which.

DESCRIPTION OF SOME EMBODIMENTS

Exemplary embodiments of the present solution will now be described more fully hereinafter with reference to the accompanying drawings, in which some, but not all embodiments of the present solution are shown. Indeed, the present solution may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present solution are applicable to any user terminal, server, corresponding component, and/or to any communication system or any combination of different communication systems utilizing reference signals and cyclic shift of reference signals. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of a system architecture to which the embodiments may be applied, an architecture based on the third-generation wireless communication system UMTS (universal mobile telecommunication system) without restricting the embodiment to such an architecture, however.

Figure 1:
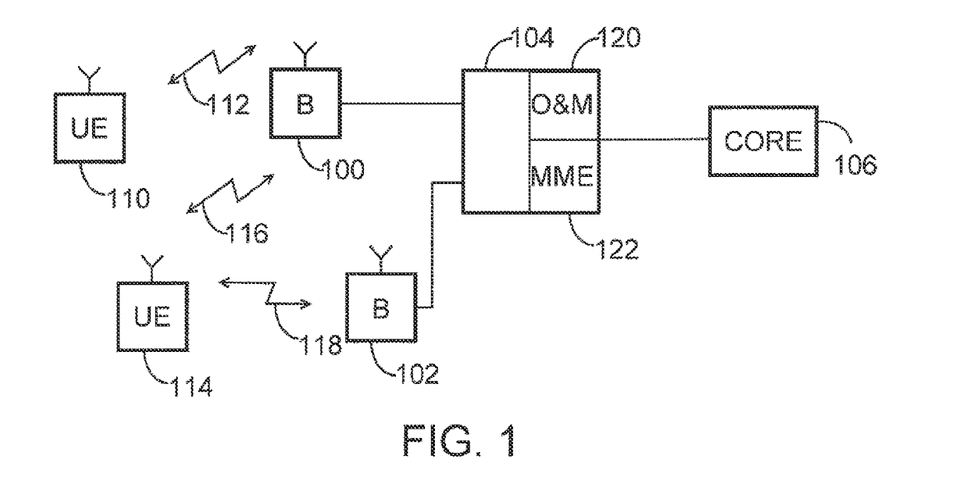
FIG. 1 is shows a simplified block diagram illustrating an exemplary system architecture.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

FIG. 1 shows two base stations or Node Bs 100 and 102. Base stations 100 and 102 are connected to a common server 104 of the network. The common server 104 may include an operation and maintenance (O&M) server 120 and a mobility management server 122. Typically, the functionalities of the O&M server include initial cell-level radio resources allocation, performance monitoring, for example. The functionalities of the mobility management server may take care of routing the connections of user equipment. The connections between the node Bs and the servers may be implemented by using Internet protocol (IP) connections. The communication network may further comprise a core network 106 connected to the common server 104.

FIG. 1 shows user equipment 110 communicating 112 with the node B 100 and user equipment 114 communicating 116, 118 with node Bs 100 and 102. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

FIG. 1 only illustrates a simplified example. In practice, the network may include more base stations and radio network controllers, and more cells may be formed by the base stations. The networks of two or more operators may overlap, the sizes and form of the cells may vary from that depicted in FIG. 1, etc.

It should be appreciated that the base stations or node Bs may also be connectable to core network elements directly (not shown in the Figure). Depending on the system, the counterpart on the core network side can be a mobile services switching centre (MSC), a media gateway (MGW), or a serving GPRS (general packet radio service) support node (SGSN), home node B gateway (HNB-GW), mobility management entity and enhanced packet core gateway (MME/EPC-GW), etc. A direct communication between different node Bs over the air interface is also possible by implementing a relay node concept, wherein a relay node may be considered as a special node B having wireless backhauls or, e.g. X2 and S1 interfaces relayed over the air interface by another node B. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet protocol (IP) connections.

In an embodiment, the user equipment 110 communicates with the base station using single user multiple input multiple output (SU-MIMO). In SU-MIMO, user equipment utilizes more than one antenna in communicating with base stations. Typically, the number of antennas may be two to four. However, the number of antennas is not limited to any specific number. SU-MIMO has been suggested to be applied in the LTE-advanced communication system (long term evolution-advanced) which is an evolution of the LTE system currently in development. The LTE-advanced is being researched by an international consortium 3GPP (third generation partnership project).

In an embodiment, multi-user multiple input multiple output (MU-MIMO) is utilised in the system. In MU-MIMO, multiple users in a cell are utilising the same transmission resources. Another technology planned to be used in the LTE-advanced system is coordinated multi-point (CoMP). CoMP applied in uplink transmission direction implies the reception of the transmission of user equipment at multiple, geographically separated points.

One important aspect in designing SU-MIMO, MU-MIMO and CoMP is the realization of reference signals used in the transmission to aid coherent reception at the receiver.

In the LTE and LTE-advanced systems, Zadoff-Chu (ZC) CAZAC sequences and modified ZC sequences may be used as reference signals or pilot signals. Modified ZC sequences comprise truncated, extended ZC sequences and computer searched zero-autocorrelation (ZAC) sequences.

The present LTE-advanced system focuses on demodulation reference signal (DMRS) allocation in the case of single user multiple input multiple output (SU-MIMO) and multi user MIMO (MU-MIMO). LTE-advanced is an evolution of LTE Rel-8 system fulfilling ITU-R requirements for IMT-advanced. 3GPP approved a new study item on LTE-advanced in RAN#39 and a new work item dealing with LTE-advanced uplink MIMO for Rel-10 in RAN#46.

Figure 2:
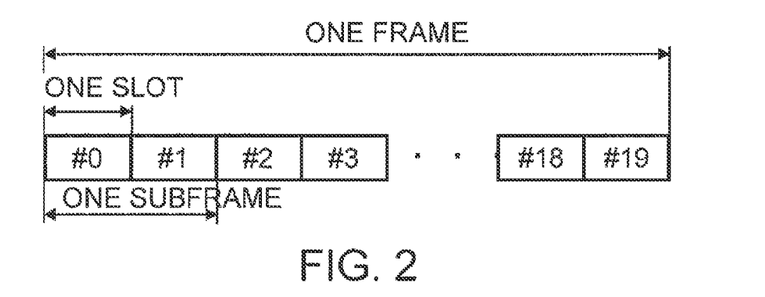
FIG. 2 illustrates an example of the frame structure of uplink LTE-advanced transmission.

FIG. 2 illustrates an example of the frame structure of uplink LTE-advanced transmission. The frame comprises 20 time slots, numbered from 0 to 19. A subframe is defined as two consecutive time slots, where subframe i comprises time slots 2i and 2i+1. In each time slot, one to three reference signal blocks are transmitted.

Cyclic shift (CS) separation is to be used as the primary multiplexing scheme of DMRS in LTE-advanced. CS separation is already used in Rel-8, to multiplex DMRS of different UEs in the case of MU-MIMO. A cyclic shift may be dynamically configured with three bits in scheduling grant. OCC (orthogonal cover code) is one option to be used as a complementary (secondary) multiplexing scheme for CS separation. Thus a capability to increase the number of orthogonal RS resources and to support different Tx bandwidths for different UEs with MU-MIMO pairing, as well as an improved orthogonality between multiplexed DMRSs are obtainable. Another option is to use IFDMA (interleaved frequency domain multiple access) as a complementary multiplexing scheme for CS separation.

If the complementary multiplexing scheme (OCC or IFDMA) is accepted, the corresponding multiplexing resource (OCC or IFDMA comb) should be configured to UE. It is also desirable that the complementary multiplexing resource is signalled dynamically as the primary multiplexing resource, CS, as long as the DMRS multiplexing is done within a cell (and not between cells, e.g. as a part of a DMRS arrangement for UL CoMP). The multiplexing resource may be signalled either explicitly or implicitly. Explicit signalling is straightforward and provides high flexibility for the configuration. However, it may not be desirable to increase the scheduling grant size due to additional signalling, and explicit signalling should provide clear performance benefits over implicit signalling. In implicit signalling, the complementary multiplexing resource is linked to some other parameter that may be determined based on the scheduling grant. The present solution enables selecting a suitable parameter for implicit signalling of an OCC/IFDMA comb, and forming an exact mapping table for the OCC/IFDMA comb. In the generation of a mapping table, an optimal DMRS for different transmission ranks for SU-MIMO as well as for a different number of UEs paired for MU-MIMO are also considered.

Figure 3:
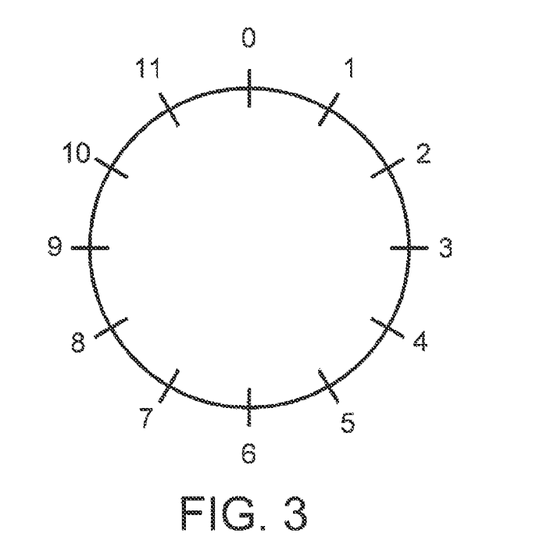
FIG. 3 illustrates an example of the available cyclic shifts for a ZC sequence having a length of 12 symbols.

FIG. 3 illustrates the available cyclic shifts for a ZC sequence having a length of 12 symbols. The cyclic shifts may be shown as a clock where different shifts are marked as 0, 1, 2, 3, ..., 11. Due to the autocorrelation properties of the ZC sequences, the best orthogonality is obtained between cyclic shifts having the largest difference in the cyclic shift domain. Thus, opposed shifts (CS0 and CS6 or CS3 and CS9, for example) in the clock lead to the best orthogonality. The worst orthogonality is between adjacent cyclic shifts (CS1 and CS0 or CS2, for example).

Figure 4:
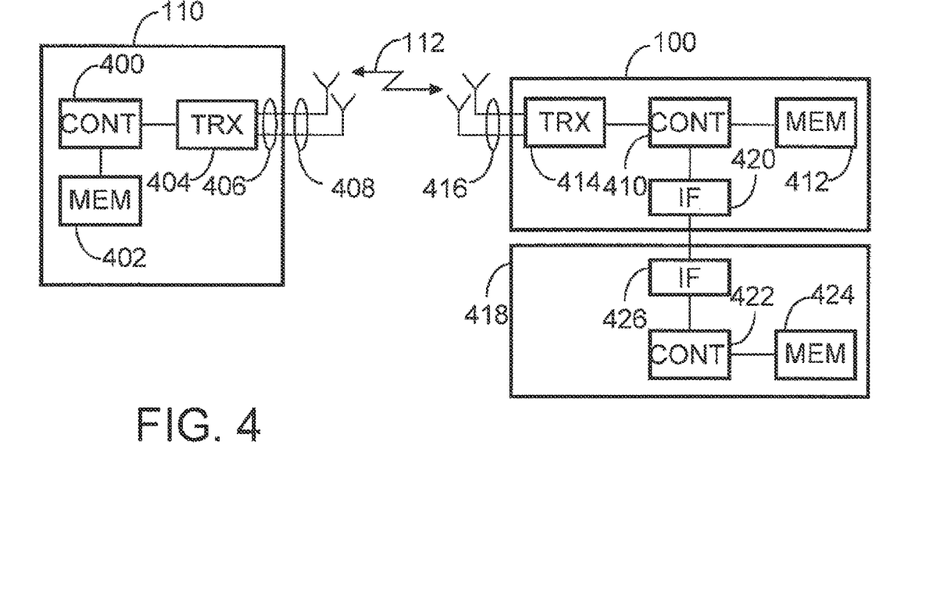
FIG. 4 illustrates apparatuses according to embodiments of the invention.

FIG. 4 illustrates examples of apparatuses according to embodiments of the invention. FIG. 4 shows user equipment 110 configured to be in a connection on a communication channel 112 with a base station 100. The user equipment 110 comprises a controller 400 operationally connected to a memory 402 and a transceiver 404. The controller 400 controls the operation of the user equipment. The memory 402 is configured to store software and data. The transceiver is configured to set up and maintain a wireless connection to a base station 100. The transceiver is operationally connected to a set of antenna ports 406 connected to an antenna arrangement 408. The antenna arrangement may comprise a set of antennas. The number of antennas may be two to four, for example. The number of antennas is not limited to any particular number.

The base station or node B 100 comprises a controller 410 operationally connected to a memory 412 and a transceiver 414. The controller 408 controls the operation of the base station. The memory 412 is configured to store software and data. The transceiver 414 is configured to set up and maintain a wireless connection to user equipment within the service area of the base station. The transceiver 414 is operationally connected to an antenna arrangement 416. The antenna arrangement may comprise a set of antennas. The number of antennas may be two to four, for example. The number of antennas is not limited to any particular number.

The base station may be operationally connected to another network element 418 of the communication system. The network element 418 may be a radio network controller, another base station, a gateway, or a server, for example. The base station may be connected to more than one network element. The base station 100 may comprise an interface 420 configured to setup and maintain the connection with the network element. The network element 418 may comprise a controller 422 and a memory 424 configured to store software and data and an interface 426 configured to be in connection with the base station. In an embodiment, the network element is connected to the base station via another network element.

In an embodiment, the user equipment is configured to utilize single user multiple input multiple output (SU-MIMO) transmission on the communication channel 112 with the base station. In SU-MIMO, the antenna arrangement comprises a set of antennas or an antenna array configured to form more than one transmission streams. The transmission streams may be obtained using several antennas, antenna beams or suitably coding, as one skilled in the art is well aware. In an embodiment, multiple spatial layers are applied at the user equipment. In another embodiment, transmission streams are used for transmit antenna diversity. The method with which the SU-MIMO transmission is realized is not relevant regarding the embodiments of the invention.

OCC may be semistatically linked to a spatial layer, wherein layer 1 and 2 use OCC #1, and layer 3 and 4 use OCC #2. OCC multiplexing is thus not efficiently used in that scheme, linking OCC to the layer. OCC would provide benefits only for SU-MIMO transmission ranks 3 and 4. However, that kind of scheme does not provide any benefit for more common transmission rank 2 or MU-MIMO with transmission rank 1, since the same OCC is used in all transmissions. Existing solutions do not disclose mapping between the cyclic shifts and the OCC/IFDMA comb suitable for DMRS both in MU-MIMO and SU-MIMO cases.

In the current LTE specification, the user equipment specific component of the cyclic shift $n_{DMRS}^{(2)}$ of a user equipment reference signal is based on Table 1 (see below) where the cyclic shift field is a parameter from higher layers and the cyclic shift slot describes the selected shift on the clock of FIG. 3. Regarding the DMRS cyclic shift configuration in Rel-8, the cyclic shift α in a slot $n_s$ is given as $$\alpha = 2\pi n_{cs}/12, \text{ with} \tag{1}$$

$$n_{cs} = (n_{DMRS}^{(1)} + n_{DMRS}^{(2)} + n_{PRS}(n_s)) \bmod 12 \tag{2}$$

where the cell-specific values of $n_{DMRS}^{(1)}$ are given below in Table 2 according to the parameter cyclicShift provided by higher layers, $n_{DMRS}^{(2)}$ is given by the cyclic shift for DMRS field in most recent DCI format 0 [3] for the transport block associated with the corresponding PUSCH transmission where the values of $n_{DMRS}^{(2)}$ are given below in Table 1. For a semi-persistently configured PUSCH transmission on subframe n in the absence of a corresponding PDCCH with a DCI format 0 in subframe $n-k_{PUSCH}$ or a PUSCH transmission associated with a random access response grant, $n_{DMRS}^{(2)}$ is set to zero. $n_{PRS}(n_s)$ is given by $$n_{PRS}(n_s) = \sum_{i=0}^{7} c(8 N_{symb}^{UL} \cdot n_s + i) \cdot 2^i \tag{3}$$

where the application of the pseudo-random sequence c(i) is cell-specific. The pseudo-random sequence generator is initialized with $$c_{init} = \left\lfloor \frac{N_{ID}^{cell}}{30} \right\rfloor \cdot 2^5 + f_{ss}^{PUSCH} \tag{4}$$

at the beginning of each radio frame.

TABLE 1

Mapping of cyclic shift field in DCI format 0 to $n_{DMRS}^{(2)}$ values.

| Cyclic shift field in DCI format 0 [3] | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

TABLE 2

Mapping of cyclicShift to $n_{DMRS}^{(1)}$ values.

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

In an embodiment, implicit signalling for the complementary multiplexing resources is provided so that optimal joint use of primary and complementary multiplexing resources achievable both in MU-MIMO and SU-MIMO. This may be achieved as follows.

In an embodiment, complementary multiplexing resource is linked to the dynamically signalled primary multiplexing resource index (i.e. OCC or IFDMA comb is linked (i.e. mapped) to the dynamically signalled cyclic shift index) in a predetermined way. A relationship between the primary and complementary multiplexing resources is defined so that different DMRS resource subsets with optimal orthogonality may be signalled for as many different numbers of multiplexed DMRSs (DMRS multiplexing orders) as possible. In this case, DMRS multiplexing orders of 2, 3 and 4 may be considered. The relationship may be derived by 1) identifying primary multiplexing resource subsets for the supported DMRS multiplexing orders so that the DMRS resources in the subset are as orthogonal as possible; within each subset, DMRS resources that cause the most significant interference to each other are identified, and the corresponding primary multiplexing resources are linked with as orthogonal complementary multiplexing resources as possible;

2) as step 1) likely results in mapping that is contradictory between different DMRS multiplexing orders, these contradictions are solved by ignoring some of the subsets (when defining mapping) for multiplexing orders with several identified subsets.

In an embodiment, the relationship between the primary multiplexing resources and the complementary multiplexing resources is predetermined in a system standardization phase, and the relationship between the multiplexing resources is tabulated.

In an embodiment, regarding the operation of the base station eNB, eNB is configured to take both primary and complementary multiplexing scheme & predetermined linkage between the primary and complementary recourses into account when allocating and/or signalling $n_{DMRS}^{(2)}$ values for different UEs in various SU-/MU-MIMO configurations requiring different number of orthogonal DMRS resources.

In an embodiment, regarding the operation of the user equipment UE, UE is configured to follow predetermined mapping between the primary and secondary DMRS resources according to a signalled $n_{DMRS}^{(2)}$ value (signalled to UE by a network apparatus (e.g. by/via a base station eNB).

A definition for the relationship between the cyclic shift and the OCC/IFDMA comb according to exemplary embodiments is disclosed below.

In an embodiment, aforementioned steps are applied for the cyclic shifts and OCC. When applying aforementioned steps for the cyclic shifts and OCC, backward compatibility may be taken into account, and the mapping may be based on the above Table 1. With cyclic shift multiplexing, interference between DMRSs is due to multipath delay spread. It may be minimized by using cyclic shifts that are as largely separated as possible. With two DMRS blocks in a subframe, there are two OCCs available, e.g. OCC#0: [1 1], OCC#1: [1 −1]. Rel-8 terminal DMRS transmission is equivalent to the use of OCC#0.

In an embodiment, regarding DMRS multiplexing order of 2, the cyclic shifts (CS) are separated by ½ of a SC-FDMA symbol.

Such $n_{DMRS}^{(2)}$ pairs in Table 1 are {0,6}, {2, 8}, {3,9}, and {4,10}. In each pair, one OCC is mapped to one CS, and the other OCC is mapped to the other CS.

In an embodiment, regarding DMRS multiplexing order of 3, the cyclic shifts are separated by ⅓ of the SC-FDMA symbol.

Such $n_{DMRS}^{(2)}$ triplets are {0,4,8} and {2,6,10}. The cyclic shifts equally interfere each other, so one OCC is mapped to two CSs, and the other OCC is mapped to one CS in the triplet.

In an embodiment, regarding DMRS multiplexing order of 4, the cyclic shifts are separated by ¼ of the SC-FDMA symbol.

Such $n_{DMRS}^{(2)}$ quadruple is {0,3,6,9}. Interference between the cyclic shift pairs {0,6} and {3,9} is more significant than between other pairs, so one OCC is mapped to pair {0,6} and the other OCC is mapped to pair {3,9}.

In an embodiment, the contradiction existing in CS-OCC mapping between DMRS multiplexing orders 2 and 4, is solved by ignoring pairs {0,6} and {3,9} for the DMRS multiplexing order 2 when defining the CS-OCC mapping. Mapping for DMRS multiplexing order of 4 may support e.g. MU-MIMO transmission where two SU-MIMO rank=2 users are multiplexed together; e.g. UE#1 uses cyclic shifts {0, 3}, and UE#2 uses cyclic shifts {6,9}, or, alternatively, UE#1 uses cyclic shifts {0, 6}, and UE#2 uses cyclic shifts {3,9}. A resulting mapping between the cyclic shifts and OCC according to an exemplary embodiment is given below in Table 3. It should be noted that the OCC assignment shown in Table 3 may also be made in such a way that [1 1] is mapped into {3,8,9,10} and [1 −1] into {0,2,4,6}, respectively. It should be noted that a similar outcome is achieved also when {0,6,8,10} and {2,3,4,9} are arranged under two OCC resources.

TABLE 3

Mapping of cyclic shift field in DCI format 0 to $n_{DMRS}^{(2)}$ values and orthogonal cover codes. The maximally orthogonal CS/OCC combinations are $n_{DMRS}^{(2)}$ {2, 8} and {4, 10} for two DMRSs, {0, 4, 8} and {2, 6, 10} for three DMRSs and {0, 3, 6, 9} for four DMRSs.

| Cyclic shift field in DCI | $n_{DMRS}^{(2)}$ | OCC |
|---|---|---|
| 000 | 0 | [1 1] |
| 001 | 6 | [1 1] |
| 010 | 3 | [1 −1] |
| 011 | 4 | [1 1] |
| 100 | 2 | [1 1] |
| 101 | 8 | [1 −1] |
| 110 | 10 | [1 −1] |
| 111 | 9 | [1 −1] |

In an embodiment, aforementioned steps are applied for the cyclic shifts and IFDMA. It is noted that the introduction of the IFDMA component already violates backward compatibility, and there is no need to restrict to the cyclic shift values specified for LTE. It may be assumed that a repetition factor of 2 is sufficient for DMRS multiplexing within a cell. In that case the DMRS sequences are multiples of 6, and thus at least six different cyclic shifts may be defined.

In an embodiment, regarding DMRS multiplexing order of 2, the cyclic shifts (CS) should be separated by ¼ of a SC-FDMA symbol. Such cyclic shift pairs are {0,3}, {1,4}, {2,5}. In each pair, one IFDMA comb is mapped to one CS, and the other IFDMA comb is mapped to the other CS.

In an embodiment, regarding DMRS multiplexing order of 3, the cyclic shifts should be separated by ⅙ of the SC-FDMA symbol. Such cyclic shift triplets are {0,2,4} and {1,3,5}. The cyclic shifts equally interfere each other, so one IFDMA comb is mapped to two CSs, and the other IFDMA comb is mapped to one CS in the triplet.

In an embodiment, regarding DMRS multiplexing order of 4, the cyclic shifts should be separated by ⅛ of the SC-FDMA symbol. However, such cyclic shift does not exist for all potential sequence lengths. So an alternative solution is to use two cyclic shifts separated by of the SC-FDMA symbol and assign both IFDMA combs for both cyclic shifts. The cyclic shift pairs are equal to the ones for the DMRS multiplexing order of 2.

There is no contradiction in the CS-IFDMA comb mapping between different DMRS multiplexing orders. A resulting mapping between the cyclic shifts and IFDMA according to an exemplary embodiment is given below in Table 4.

TABLE 4

Mapping of cyclic shift field in DCI format 0 to $n_{DMRS}^{(2)}$ values and IFDMA transmission combs.

| Cyclic shift field in DCI | $n_{DMRS}^{(2)}$ | IFDMA comb. |
|---|---|---|
| 000 | 0 | 0 |
| 001 | 0 | 1 |
| 010 | 1 | 0 |
| 011 | 2 | 0 |
| 100 | 3 | 0 |
| 101 | 3 | 1 |
| 110 | 4 | 1 |
| 111 | 5 | 1 |

As disclosed above, it is not expected that IFDMA with a repetition factor (RPF) above 3 is needed in LTE-advanced for the DMRS multiplexing within a single cell. However, a repetition factor above 2, e.g. 3, may be needed for CoMP where particular IFDMA combs may be assigned for each cell. In that case, a cell-specific cyclicShift parameter, currently used to signal the $n_{DMRS}^{(1)}$ value, may be used to signal the cell-specific IFDMA comb for DMRS. The combination of IFDMA and the cyclic shift may require the introduction of new sequence lengths for DMRS. In that case all sequence lengths are not necessarily multiples of 12, but e.g. multiples of 6 for RPF=2, or multiples of 4 for RPF=3. This should be taken into account in the signalling of the UE-specific cyclic shift. The UE-specific cyclic shift value may still be signalled with the cyclic shift field in DCI format 0, but the resulting $n_{DMRS}^{(2)}$ values should be divided further by RPF. A UE-specific cyclic shift is given by $$n_{cs} = (n_{DMRS}^{(1)} + n_{DMRS}^{(2)}/\text{RPF} + n_{PRS}(n_s)) \bmod N \quad (5)$$

where N is the smallest sequence length. It should be noted that SU-MIMO terminals may be configured by RRC to follow different mapping between primary and complementary multiplexing resources, thus overriding the presented mapping. This provides a solution to rely more on one multiplexing scheme than on the other in challenging radio channel environments. This may be advantageous e.g. when high transmission rank is configured for a SU-MIMO terminal in a radio channel with a long delay spread; SU-MIMO may only use 2 cyclic shifts for rank 4 transmission.

In an embodiment, small additional complexity is included on top of the Rel-8 operation. Impact to legacy operation is not necessary; legacy terminals may be part of MU-MIMO pairing. An improved DMRS orthogonality may be provided by the introduction of the complementary multiplexing scheme for both MU-MIMO and SU-MIMO. An optimal DMRS orthogonality may be achieved for the DMRS multiplexing orders of 2, 3 and 4. The DMRS orthogonality may also be improved for multiplexing order of 6. MU-MIMO pairing with SU-MIMO UEs with transmission rank over 2 may also be supported.

Figure 5A:
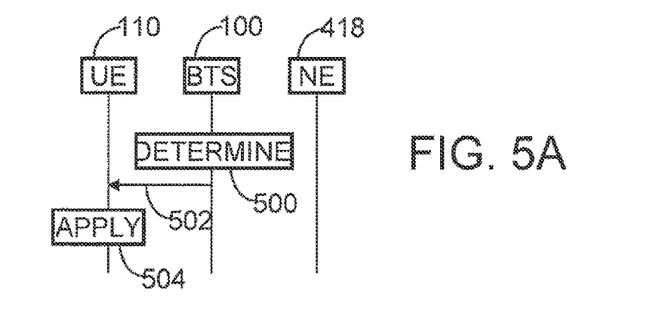
FIGS. 5A and 5B are signalling charts illustrating embodiments of the invention.
Figure 5B:
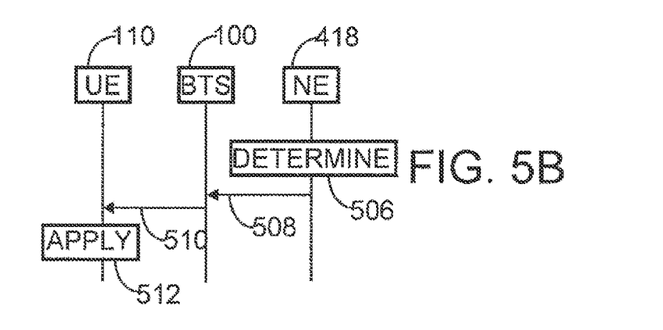
Figure 6A:
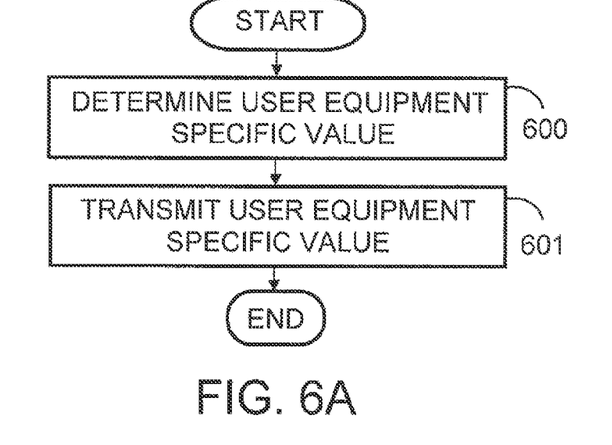
FIGS. 6A and 6B are flow charts illustrating embodiments of the invention.

In an embodiment, the base station or the network element may transmit the user equipment-specific value $n_{DMRS}^{(2)}$ to the user equipment. The signalling charts of FIGS. 5A and 5B illustrate the required signalling. In the example of FIG. 5A, the base station 100 determines 500 the user equipment-specific value and transmits 502 the value to the user equipment 110. The user equipment 110 and the base station 100 may then apply 504 the value. If the network element which determined the user equipment-specific value is not the base station, the element may transmit the value to the user equipment via the base station. This is illustrated in the example of FIG. 5B. The network element 418 determines 506 the user equipment-specific value and transmits 508 the value to the base station 100. The base station 100 transmits 510 the value further to the user equipment 110. The user equipment 110 and the base station 100 may then apply 512 the value. FIG. 6A is a flow chart illustrating a non-limiting embodiment of the invention. In step 600, the network element determines the user equipment specific value $n_{DMRS}^{(2)}$. In step 601, the network element transmits the value to the user equipment.

Figure 6B:
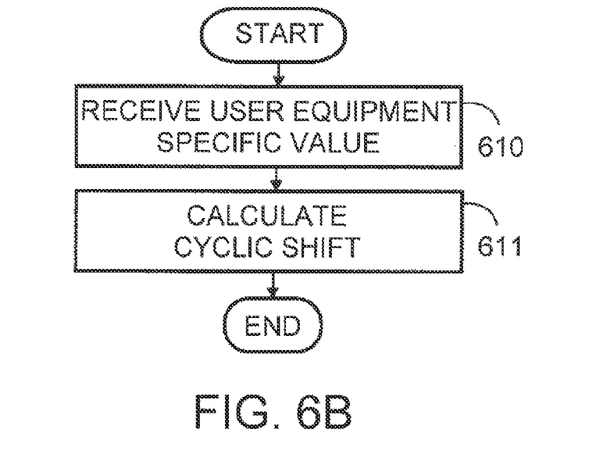

FIG. 6B is a flow chart illustrating a non-limiting embodiment of the invention from the user equipment's point of view. In step 610, the user equipment receives a user equipment specific value $n_{DMRS}^{(2)}$ from the base station. The value may be received in connection with an uplink scheduling assignment. In step 611, the user equipment calculates the cyclic shift based on the received value and equations (1) to (5).

The steps, signalling messages and related functions described in FIGS. 1 to 6B are in no absolute chronological order, and some of the steps may be performed simultaneously or in an order differing from the given one. Other functions can also be executed between the steps or within the steps and other signalling messages sent between the illustrated messages. Some of the steps can also be left out or replaced with a corresponding step. The signalling messages are only exemplary and may even comprise several separate messages for transmitting the same information. In addition, the messages may also contain other information.

An apparatus able to perform the above-described steps may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the cyclic shift of reference signals of user equipment utilizing single user multiple input multiple output transmission as described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 800, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP third generation partnership project
LTE long term evolution
MIMO multiple input multiple output
IMT international mobile telecommunications DCI downlink control information
UE user equipment
SC-FDMA single carrier frequency division multiple access
UL uplink
CoMP coordinated multi-point
RPF repetition factor
RRC radio resource control
RS reference signal
Tx radio transmitter
CS cyclic shift
DMRS demodulation reference signal
IFDMA interleaved frequency domain multiple access
MU-MIMO multi-user multiple input multiple output
OCC orthogonal cover code
PUSCH physical uplink shared channel
SU-MIMO single-user multiple input multiple output
eNB enhanced node B
$n_s$ slot number within radio frame,
$n_{cs}$ cyclic shift index,
$n_{DMRS}^{(1)}$ cell-specific ("static") component of cyclic shift of demodulation reference signal,
$n_{DMRS}^{(2)}$ user equipment-specific ("dynamic") component of cyclic shift of demodulation reference signal,
$n_{PRS}$ pseudo-random component of cyclic shift of demodulation reference signal

The invention claimed is:

1. A method comprising:
controlling demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources,
wherein at least one complementary multiplexing resource is linked to a signalled primary multiplexing resource,
wherein the primary multiplexing resources are indicated by a cyclic shift index signalled to the user equipment, and
defining a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
based on determining that more than one of the different demodulation reference signal resource subsets have contradicting multiplexing resources, ignoring for the defined linkage a contradicting at least one cyclic shift of an orthogonal resource pair in more than one of the different demodulation reference signal resource subsets for different orders of the plurality of different demodulation reference signal multiplexing orders; and
controlling demodulation reference signal allocation of the user equipment according to the defined linkage and the cyclic shift index.

2. The method according to claim 1, wherein primary multiplexing resource subsets are identified for the different demodulation reference signal multiplexing orders so that the demodulation reference signal resources in the subsets are orthogonal; and wherein the interference comprises multipath delay spread interference.

3. The method according to claim 1, wherein the demodulation reference signal multiplexing resources are signaled to the user equipment at least one of explicitly or implicitly, and wherein the controlling is utilizing at least one of single user multiple input multiple output transmission and multiple user multiple input multiple output transmission with the different demodulation reference signal multiplexing resources.

4. The method according to claim 1, wherein based on the contradiction existing between demodulation reference signal multiplexing orders 2 and 4, the ignoring comprises ignoring pairs {0,6} and {3,9} for demodulation reference signal multiplexing order 2.

5. The method according to claim 1, wherein for a demodulation reference signal multiplexing order of 2, the cyclic shifts resources are separated by ¼ of a single carrier frequency division multiple access symbol, for a demodulation reference signal multiplexing order of 3, the cyclic shifts resources are separated by ⅙ of a single carrier frequency division multiple access symbol, and for a demodulation reference signal multiplexing order of 4, the cyclic shifts resources are separated by ⅛ of a single carrier frequency division multiple access symbol.

6. A method comprising:
applying demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources,
wherein at least one complementary resource is linked to a signalled primary multiplexing resource,
wherein the primary multiplexing resources are indicated by a cyclic shift index signalled to the user equipment, and
defining a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
based on determining that more than one of the different demodulation reference signal subsets have contradicting multiplexing resources, ignoring for the defined linkage a contradicting at least one cyclic shift of an orthogonal resource pair in more than one of the different demodulation reference signal resource subsets for different orders of the plurality of different demodulation reference signal multiplexing orders; and
controlling demodulation reference signal allocation of the user equipment according to the defined linkage and the cyclic shift index.

7. The method according to claim 6, wherein primary multiplexing resource subsets are identified for the different demodulation reference signal multiplexing orders so that the demodulation reference signal resources in the subsets are orthogonal; and wherein within each subset demodulation reference signal resources that cause interference to each other are identified.

8. A method comprising:
   determining demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment;
   defining a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
   based on determining that the more than one of the different demodulation reference signal resource subsets have contradicting multiplexing resources, ignoring for the defined linkage a contradicting at least one cyclic shift of an orthogonal resource pair in more than one of the different demodulation reference signal resource subsets for different orders of the plurality of different demodulation reference signal multiplexing orders; and
   controlling demodulation reference signal allocation of the user equipment according to the defined linkage and the cyclic shift index.

9. The method according to claim 8, wherein multiplexing resource subsets are identified for the different demodulation reference signal multiplexing orders so that the demodulation reference signal resources in the subsets are orthogonal; and wherein within each subset demodulation reference signal resources that cause interference to each other are identified.

10. An apparatus comprising:
    at least one processor and
    at least one memory including computer program code, where the at least one memory and the computer program code are configured with the at least one processor, to cause the apparatus to at least:
    control demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment;
    define a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
    based on determining that more than one of the different demodulation reference signal resource subsets have contradicting multiplexing resources, ignoring for the defined linkage a contradicting at least one cyclic shift of an orthogonal resource pair in more than one of the different demodulation reference signal resource subsets for different orders of the plurality of different demodulation reference signal multiplexing orders; and
    control demodulation reference signal allocation of the user equipment according to the defined linkage and the cyclic shift index.

11. The apparatus according to claim 10, wherein primary multiplexing resource subsets are identified for the different demodulation reference signal multiplexing orders so that the demodulation reference signal resources in the subsets are orthogonal; and wherein within each subset demodulation reference signal resources that cause interference to each other are identified.

12. The apparatus according to claim 10, wherein the demodulation reference signal multiplexing resources are signaled to the user equipment at least one of explicitly or implicitly, and wherein the controlling is utilizing at least one of single user multiple input multiple output transmission and multiple user multiple input multiple output transmission with the different demodulation reference signal multiplexing resources.

13. The apparatus according to claim 10, wherein the at least one processor and the at least one memory including the computer program code is further configured to cause the apparatus to at least one of allocate and signal a $n_{DMRS}^{(2)}$ value for the user equipment, wherein the $n_{DMRS}^{(2)}$ value is a user equipment specific component of the cyclic shift of a user equipment demodulation reference signal.

14. The apparatus according to claim 10, wherein the at least one processor and the at least one memory including the computer program code is further configured to cause the apparatus to separate the cyclic shifts by ½ of a single carrier frequency division multiple access symbol for a demodulation reference signal multiplexing order of 2, to form $n_{DMRS}^{(2)}$ value pairs for mapping of orthogonal cover codes to the cyclic shift index, wherein the $n_{DMRS}^{(2)}$ value is a user equipment specific component of the cyclic shift of a user equipment demodulation reference signal.

15. The apparatus according to claim 10, wherein the at least one processor and the at least one memory including the computer program code is further configured to cause the apparatus to separate the cyclic shifts by ⅓ of a single carrier frequency division multiple access symbol for a demodulation reference signal multiplexing order of 3, to form $n_{DMRS}^{(2)}$ value triplets for mapping of orthogonal cover codes to the cyclic shift index, wherein the $n_{DMRS}^{(2)}$ value is a user equipment specific component of the cyclic shift of a user equipment demodulation reference signal.

16. The apparatus according to claim 10, wherein the at least one processor and the at least one memory including the computer program code is further configured to cause the apparatus to separate the cyclic shifts by ¼ of a single carrier frequency division multiple access symbol for a demodulation reference signal multiplexing order of 4, to form $n_{DMRS}^{(2)}$ value quadruples for mapping of orthogonal cover codes to the cyclic shift index, wherein the $n_{DMRS}^{(2)}$ value is a user equipment specific component of the cyclic shift of a user equipment demodulation reference signal.

17. An apparatus comprising:
at least one processor and
at least one memory including computer program code, where the at least one memory and the computer program code are configured with the at least one processor, to cause the apparatus to at least:
apply demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment;
define a linkage between the primary multiplexing resources and the complementary multiplexing resources such that different demodulation reference signal resource subsets with optimal orthogonality can be signalled for different demodulation reference signal multiplexing orders, wherein the linkage comprises cyclic shift resources within each of the different demodulation reference signal resource subsets that interfere with each other are separated from one another by different complimentary multiplexing resources;
based on determining that more than one of the different demodulation reference signal resource subset has contradicting multiplexing resources, the defined linkage is ignoring a contradicting at least one cyclic shift of an orthogonal resource pair in more than one of the different demodulation reference signal resource subsets for different orders of the plurality of different demodulation reference signal multiplexing orders; and
control demodulation reference signal allocation of the user equipment according to the defined linkage and the cyclic shift index.

18. The apparatus according to claim 17, wherein primary multiplexing resource subsets are identified for the different demodulation reference signal multiplexing orders so that the demodulation reference signal resources in the subsets are orthogonal; and wherein within each subset demodulation reference signal resources that cause interference to each other are identified.

19. An apparatus comprising:
at least one processor and
at least one memory including computer program code, where the at least one memory and the computer program code are configured with the at least one processor, to cause the apparatus to at least:
determine demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment;
define a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
based on determining that more than one of the different demodulation reference signal resource subsets have contradicting multiplexing resources, the defined linkage is ignoring a contradicting at least one cyclic shift of an orthogonal resource pair in more than one of the different demodulation reference signal resource subsets for different orders of the plurality of different demodulation reference signal multiplexing orders; and
control demodulation reference signal allocation of the user equipment according to the defined linkage and the cyclic shift index.

20. A non-transitory computer readable memory embodying a program of instructions executable by a processor to perform actions comprising:
controlling demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment, and wherein a linkage between the primary multiplexing resources and the complementary multiplexing resources is defined such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
based on determining that more than one of the different demodulation reference signal resource subsets have contradicting multiplexing resources, the defined linkage is ignoring a contradicting at least one cyclic shift of an orthogonal resource pair in more than one of the different demodulation reference signal resource subsets for different orders of the plurality of different demodulation reference signal multiplexing orders; and
controlling demodulation reference signal allocation of the user equipment according to the defined linkage and the cyclic shift index.

21. A non-transitory computer readable memory embodying a program of instructions executable by a processor to perform actions comprising:
- determining demodulation reference signal multiplexing resources supported by a user equipment, the resources comprising primary multiplexing resources and complementary multiplexing resources, the primary multiplexing resources including cyclic shift resources and the complementary multiplexing resources including at least one of orthogonal cover code resources and interleaved frequency domain multiple access resources, wherein at least one complementary resource is linked to a signalled primary multiplexing resource, wherein the primary multiplexing resources are indicated by a cyclic shift index signalled to the user equipment;
- defining a linkage between the primary multiplexing resources and the complementary multiplexing resources such that different demodulation reference signal resource subsets with optimal orthogonality can be signalled for a plurality of different demodulation reference signal multiplexing orders, wherein the linkage comprises cyclic shift resources within each of the different demodulation reference signal resource subsets that interfere with each other are separated from one another by different complimentary multiplexing resources;
- based on determining that more than one of the different demodulation reference signal resource subsets have contradicting multiplexing resources, the defined linkage is ignoring a contradicting at least one cyclic shift of an orthogonal resource pair in more than one of the different demodulation reference signal resource subsets for different orders of the plurality of different demodulation reference signal multiplexing orders; and
- controlling demodulation reference signal allocation of the user equipment according to the defined linkage and the cyclic shift index.

* * * * *

UNITED STATES PATENT AND TRADEMARK OFFICE
CERTIFICATE OF CORRECTION

PATENT NO. : 9,887,858 B2  
APPLICATION NO. : 13/520897  
DATED : February 6, 2018  
INVENTOR(S) : Kari Juhani Hooli et al.

Page 1 of 1

It is certified that error appears in the above-identified patent and that said Letters Patent is hereby corrected as shown below:

In Claim 20:
Column 18, Line 56, "that" should be deleted and --that the-- should be inserted.

Signed and Sealed this
Third Day of April, 2018

Andrei Iancu
*Director of the United States Patent and Trademark Office*